United States Patent
Newberth, III et al.

(10) Patent No.: US 6,812,296 B1
(45) Date of Patent: Nov. 2, 2004

(54) METHODS AND COMPOSITIONS FOR INCORPORATING FREE WATER INTO A SEALANT COMPOSITION

(76) Inventors: Frederick F. Newberth, III, 41 Long View Rd., West Hartford, CT (US) 06107; Peter J. Chupas, 350 N. Loop Rd., Apt. A201A, Stony Brook, NY (US) 11794

( * ) Notice: Subject to any disclaimer, the term of this patent is extended or adjusted under 35 U.S.C. 154(b) by 0 days.

(21) Appl. No.: 10/377,741

(22) Filed: Mar. 4, 2003

Related U.S. Application Data

(60) Provisional application No. 60/361,860, filed on Mar. 5, 2002.

(51) Int. Cl.[7] .................................................. C08F 8/46
(52) U.S. Cl. ...................... 525/386; 525/262; 525/285; 34/337; 34/339; 34/344; 34/345
(58) Field of Search .................................. 525/262, 285, 525/386, 27, 242, 303; 34/337, 339, 344, 345; 526/193, 194, 298; 156/275.7

(56) References Cited

U.S. PATENT DOCUMENTS

| | | | | |
|---|---|---|---|---|
| 3,832,334 A | * | 8/1974 | O'Sullivan | 526/225 |
| 4,196,271 A | * | 4/1980 | Yamada et al. | 525/242 |
| 4,916,184 A | | 4/1990 | Clark | 525/27 |
| 6,093,780 A | | 7/2000 | Attarwala | 526/298 |
| 6,231,714 B1 | | 5/2001 | Woods et al. | 156/275.7 |

FOREIGN PATENT DOCUMENTS

| | | | |
|---|---|---|---|
| SU | 478855 | * | 10/1975 |
| SU | 495335 | * | 4/1976 |
| SU | 1260381 | * | 9/1986 |

* cited by examiner

Primary Examiner—Tatyana Zalukeva

(57) ABSTRACT

The present invention provides compositions and methods for removing water from a sealant composition. This includes the addition of a particularly selected anhydride to a sealant composition and further addition of an acrylic acid, in order to remove water from a sealant composition.

7 Claims, No Drawings

METHODS AND COMPOSITIONS FOR INCORPORATING FREE WATER INTO A SEALANT COMPOSITION

This application claims the benefit of Provional Application Ser. No.60/361,860 filed Mar. 5, 2002.

BACKGROUND OF THE INVENTION

FIELD OF THE INVENTION

The present invention relates to a method for the removal of free water from a sealant composition by incorporating the water into a component that is reactive with the sealant composition. Specifically, the method includes the addition of an anhydride to the sealant to react with water present in the composition and produce a total reactive system.

BREIEF DESCRIPTION OF RELATED TECHNOLOGY

Sealant compositions, especially anaerobically curable sealant compositions are known to be used in the impregnation of porous components and as threadlockers. See e.g. U.S. Pat. No. 6,231,714 to Woods et al., U.S. Pat. No. 6,093,780 to Attarwala, and U.S. Pat. No. 4,916,184 to Clark. One method of impregnating the components with the sealant composition includes immersing the component in a tank filled with the sealant composition. A vacuum or pressure means may then be added to the system to force the sealant composition into the pores of the component.

Given the nature of the method of impregnation, the tanks have a tendency to become contaminated with water as a result of exposure to the atmosphere. The water frequently forms an emulsion with the sealant composition. When this happens, the tanks of the sealant solution, which are generally clear, become cloudy. When water is present in the sealant composition, it may be introduced into the porosity of the component which interferes with the effectiveness of the sealant and decreases the speed of cure. Therefore, the contamination by water makes the sealant composition unusable requiring the disposal and replacement of the contaminated sealant or removal of the water.

Conventional methods of removing the water from the sealant composition include aerating the tanks and aerating the tanks under a vacuum. These procedures are both time-consuming and costly. Moreover, when the tanks are being aerated, they may not be used which decreases production.

A method for removing the water contaminant that is relatively less expensive than conventional methods and reduces loss in production time is needed. Methods and compositions for incorporating water into a sealant system to form a total active curable composition are particularly desirable.

SUMMARY OF THE INVENTION

One aspect of the present invention provides a method of substantially removing water from a sealant composition. This method includes the step of adding to the sealant composition an effective amount of an anhydride, which is capable of reacting with water to form a component that will not substantially interfere with the effectiveness of the sealant composition.

Another aspect of the present invention provides a method of incorporating water into a curable composition. This method includes the step of adding a component capable of reacting with water to the curable composition.

The present invention also provides a curable composition including a (meth)acrylate monomer, a component reactive with the monomer including the in situ reaction product of an anhydride and water, and a cure system for the (meth)acrylate monomer.

A further aspect of the present invention provides a curable composition including a (meth)acrylate monomer, a reactive acid component formed in situ including the reaction product of an anhydride and water, and a cure system for the(meth)acrylate monomer.

A still further aspect of the present invention provides a curable composition including the reaction product of a (meth)acrylate monomer component, a cure system for the (meth)acrylate monomer, an anhydride, and water.

A method of removing water from a curable composition is also provided that includes the step of adding to the curable composition an effective amount of a component capable of reacting with water to form an acid that is reactive with the curable composition.

DETAILED DESCRIPTION OF THE INVENTION

The methods and compositions of the present invention may be used with a variety of curable compositions, especially those including (meth)acrylate monomers, which have become contaminated with water. In order to incorporate the water into the curable composition, which may include a (meth)acrylate monomer and a cure system, an anhydride is added to the curable composition which forms a component that is reactive with the curable composition.

As used herein, the term "(meth)acrylate" or "(meth) acrylic" refers to acrylate and/or methacrylate species. The term "mono(meth)acrylate" refers to the presence of a single (meth)acrylate group, while the term "multi(meth)acrylate" refers to more than one (meth)acrylate group.

The (meth)acrylate monomer may include a mono(meth) acrylate, a multi(meth)acrylate, or a combination thereof. Specific examples of both are described in further detail below.

The multi(meth)acrylate is a polymerizable crosslinkable component. Examples of multi(meth)acrylates include ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopentyl glycol diacrylate, pentaerythritol tetraacrylate, 1,2-butylene glycol diacrylate, trimethylolpropane ethoxylate trimethacrylate, glycerol propoxylate trimethacrylate, trimethylolpropane trimethacrylate, dipentaerythritol monohydroxy pentamethacrylate, tri(propylene glycol) dimethacrylate, neopentylglycol propoxylate dimethacrylate, 1,4-butanediol dimethacrylate, polyethylene glycol dimethacrylate, triethylene glycol dimethacrylate, butylene glycol di(meth) acrylate, ethoxylated bisphenol A dimethacrylate and combinations thereof.

Examples of mono(meth)acrylates useful in the present invention include those which conform to the structure:

$H_2C=CGCO_2R$ wherein G may be hydrogen, halogen or alkyl of 1 to about 4 carbon atoms, and R may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulfonate, sulfone and the like.

Examples of polar group functionalized mono(meth) acrylates include cyclohexylmethacrylate, hydroxyethyl acrylate, hydroxypropyl methacrylate, t-butylaminoethyl methacrylate, cyanoethylacrylate, and chloroethylmethacrylate. Other common monofunctional esters include alkyl esters such as lauryl methacrylate. Many lower molecular weight alkyl esters exhibit volatility, and frequently it may be more desirable to use a higher molecular weight homologue, such as decyl methacrylate or dodecyl methacrylate, or any other fatty acid acrylate esters, in (meth)acrylate-based impregnant compositions.

Hydroxyalkyl (meth)acrylates are also useful. The alkyl portion may be selected from numerous linear, branched or cyclic groups, e.g., having 1–20 carbon groups, which may also include various substitutions.

Desirably at least a portion of the (meth)acrylic monomer comprises a di- or other multi(meth)acrylate ester. These multifunctional monomers produce cross-linked polymers, which serve as more effective and more durable sealants. Various (meth)acrylate monomers may be used, such as those multi(meth)acrylate esters which have the following general formula:

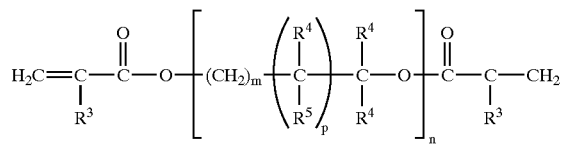

wherein $R^4$ represents a radical selected from the group consisting of hydrogen, lower alkyl of from 1 to about 4 carbon atoms, hydroxyalkyl of from 1 to about 4 carbon atoms, and

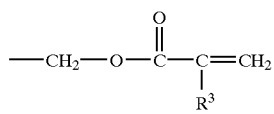

$R^3$ is a radical selected from the group consisting of hydrogen, halogen, and lower alkyl of from 1 to about 4 carbon atoms; $R^5$ is a radical selected from hydrogen, hydroxyl, and

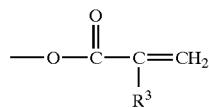

m may be 0 to 12, preferably from 0 to about 6; n is at least 1 (e.g., 1 to about 20 or more, preferably between about 2 to about 6); and p is 0 or 1.

Examples of these polymerizable multi(meth)acrylate esters include, but are not limited to, di-, tri- and tetraethyleneglycol dimethacrylate, dipropyleneglycol; dimethacrylate; polyethyleneglycol dimethylacrylate; di(pentamethyleneglycol) dimethacrylate; tetraethyleneglycol diacrylate; tetra-ethyleneglycol di(chloracrylate); diglycerol diacrylate; diglycerol tetramethacrylate; tetramethylene dimethacrylate; ethylene dimethacrylate; and neopentylglycol diacrylate. Others include, triethyleneglycol dimethacrylate, butyleneglycol dimethacrylate, bis (methacryloxyethyl) phosphate, 1,4-butane diol di(meth) acrylate and trimethylol propane dimethacrylate.

The methods and compositions of the present invention also include a cure system for the monomer including a free radical initiator such as a peroxide. A number of well known initiators of free radical polymerization may be incorporated in the present invention. Among those included are, without limitation, hydroperoxides, such as cumene hydroperoxide (CHP), paramenthane hydroperoxide, tertiary butyl hydroperoxide (TBH) and tertiary butyl perbenzoate. Useful amounts of peroxide compounds typically range from about 0.1 to about 10% by weight of the total composition. A reducing agent, such as saccharin, may also be included.

While the compositions are anaerobically curable, meaning in the substantial absence of oxygen, they are also optionally heat curable. For this reason a heat curing catalyst may also be employed. In addition, a UV photoinitiator may be added or employed for UV and actinic radiation cure.

Stabilizers and inhibitors may also be employed as well as chelating agents to control and prevent premature peroxide decomposition and polymerization. Among those useful inhibitors include phenols such as hydroquinone and quinones. Chelating agents may be used to remove trace amounts of metal contaminants. An example of a useful chelating agent is the tetrasodium salt of ethylenediamine tetraacetic acid (EDTA).

Other agents such as thickeners, plasticizers, fillers, elastomers, thermoplastics, and other well-known additives may be incorporated where functionally desirable.

The anaerobically curable compositions may be used to impregnate porous active or inactive surfaces by any conventional impregnation means such as wet vacuum impregnation, wet vacuum/pressure impregnation, or dry vacuum/pressure impregnation. Active surfaces are generally those which are ferrous-containing and inactive surfaces include, for example, non-ferrous metals, or wood and plastic. The impregnate is then allowed to cure in the surface either at room temperature or heated.

The anaerobically curable compositions are also useful as threadlockers, i.e. to secure a nut to a bolt. This is achieved by applying the composition to the threads of a bolt, mating it with a nut and allowing it to cure.

The component added to the curable composition is desirably an anhydride. The anhydride that is added to the curable composition is allowed to react with the water that has been introduced to the composition. The reaction of the water and anhydride forms an acid. Desirably, the anhydride is chosen such that the acid that consequently forms will be reactive with the composition. Specifically, the anhydride desirably includes at least one (meth)acrylate group. Examples of useful anhydrides include, but are not limited to maleic anhydride and methacrylic anhydride.

In the situation where water must be removed from a sealant system, speed in removing the water is another advantage. An acrylic acid may also be added to the composition, which increases the speed of the reaction of the anhydride with the water.

EXAMPLE

One effect of the introduction of water to a sealant system is a decrease in the speed of cure of the sealant. Therefore, in order to measure the effectiveness of the compositions and methods of the present invention, the gel time at a temperature of 55° C. was measured for several sealant compositions to which different amounts of water, anhydride and acid were added. Each of the sealant compositions is based on RESINOL® RTC Penetrating sealant, available from Loctite Corporation, Rocky Hill, Conn. The compositions were as follows in Table

TABLE I

| Added Component | Composition | | | | | | | |
|---|---|---|---|---|---|---|---|---|
| | 1 | 2 | 3 | 4 | 5 | 6 | 7 | 8 |
| 2% water | | X | X | X | X | | | |
| 10% methacrylic anhydride | | | X | X | X | X | | X |
| 1% acrylic acid | | | | X | X | | X | X |

X - Indicates that component was added to the sealant composition

The gel time of each of the compositions was measured initially, then after 30 min. aeration, 60 min. aeration, and 3 days aeration. The results of each of these are shown in Table II, below:

TABLE II

| | GEL TIME | | | |
|---|---|---|---|---|
| COMPOSITION | INITIAL | AT 30 MIN AERATION | AT 60 MIN. AERATION | AT 3 DAYS AERATION |
| 1 | 6.5 | 6 | 6 | 5 |
| 2 | 10 | 9.5 | 9 | 5 |
| 3 | 10 | 10 | 9 | 7 |
| 4 | 10 | 10 | 11 | 9.5 |
| 5 | 11 | 11 | 10.5 | 6 |
| 6 | 6.5 | 7.5 | 7.5 | 7 |
| 7 | 8 | 7.5 | 7.5 | 6 |
| 8 | 7.5 | 9 | 9 | 9 |

Comparative composition 1 shows the general trend of reduction in gel time after aeration. Comparative composition 2 shows that the gel time is increased with the addition of water. The inventive compositions 3–4 and 6 demonstrate that the addition of an anhydride, which will react with free water in the composition, contributes to a decrease in the gel time of the composition. This is a result of the removal of the free water in the composition which promotes not only a speed in curing time, but also provides an enhanced strength of cure.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

What is claimed is:

1. A method of substantially removing water from a sealant composition comprising the step of adding to said sealant composition an effective amount of an anhydride capable of reacting with water to form a component that will not substantially interfere with the effectiveness of said sealant composition, further comprising a step of adding an acrylic acid to said sealant composition.

2. The method of claim 1, wherein said anhydride is selected from the group consisting of maleic anhydride, (meth)acrylic anhydride, and combinations thereof.

3. The method of claim 1, wherein said component is capable of reacting with said sealant composition.

4. The method of claim 1, wherein said sealant composition comprises a (meth)acrylate monomer and a cure system.

5. The method of claim 1, wherein said monomer further comprises a combination of a poly(meth)acrylate and mono (meth)acrylate.

6. The method of claim 1, wherein said (meth)acrylate monomer is a member selected from the group consisting of ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopertyl glycoldiacrylate, pentaerythritol tetraacrylate, 1,2-butylene glycoldiacrylate, trimethylopropane ethoxylate trimethacrylate, glyceryl propoxylate trimethacrylate, trimethylolpropane trimethacrylate, dipentaerythritol monohydroxy pentamethacrylate, tri(propylene glycol) dimethacrylate, neopentylglycol propoxylate dimethacrylate, 1,4-butanediol dimethacrylate, polyethyleneglycol dimethacrylate, triethylene glycol dimethacrylate, butylene glycol di(meth)acrylate, ethoxylated bisphenol A dimethacrylate, cyclohexylmethacrylate, hydroxyethyl acrylate, hydroxypropyl methacrylate, t-butylaminoethyl methacrylate, cyanoethylacrylate, chloroethylmethacrylate, decyl methacrylate, dodecyl methacrylate, 1 tetradecyl methacrylate, hexadecyl methacrylate, and combinations thereof.

7. A method of removing water from a curable composition comprising the step of adding to said curable composition an effective amount of an anhydride capable of reacting with said water to form an acid that is reactive with said curable composition, further comprising a step of adding an acrylic acid to said curable composition.

* * * * *